US012562640B2

(12) United States Patent
Gou et al.

(10) Patent No.: US 12,562,640 B2
(45) Date of Patent: Feb. 24, 2026

(54) HIGH-DYNAMIC-RESPONSE SWITCHING POWER SUPPLY AND SERVER

(71) Applicant: INSPUR SUZHOU INTELLIGENT TECHNOLOGY CO., LTD., Jiangsu (CN)

(72) Inventors: Changhua Gou, Shandong (CN); Dali Li, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 298 days.

(21) Appl. No.: 18/252,579

(22) PCT Filed: Sep. 28, 2021

(86) PCT No.: PCT/CN2021/121435
§ 371 (c)(1),
(2) Date: May 11, 2023

(87) PCT Pub. No.: WO2022/105449
PCT Pub. Date: May 27, 2022

(65) Prior Publication Data
US 2024/0030814 A1      Jan. 25, 2024

(30) Foreign Application Priority Data

Nov. 20, 2020     (CN) .......................... 202011311785.6

(51) Int. Cl.
*H02M 3/00*          (2006.01)
*H02M 1/00*          (2006.01)
(Continued)

(52) U.S. Cl.
CPC ........... *H02M 3/01* (2021.05); *H02M 1/0095* (2021.05); *H02M 3/158* (2013.01); *G06F 1/263* (2013.01)

(58) Field of Classification Search
CPC ...... H02M 3/01; H02M 1/0095; H02M 3/156; H02M 3/158; G06F 1/26; G06F 1/263
See application file for complete search history.

(56) References Cited

U.S. PATENT DOCUMENTS 7,915,874 B1      3/2011  Cuk
2013/0121033 A1*  5/2013  Lehn ..................... H02M 3/158
                                                                         363/16
(Continued)

FOREIGN PATENT DOCUMENTS

CN          206099805 U      4/2017
CN          108258907 A      7/2018
(Continued)

OTHER PUBLICATIONS

International search report for PCT/CN2021/121435 mailed on Dec. 17, 2021.
(Continued)

*Primary Examiner* — Gary L Laxton
(74) *Attorney, Agent, or Firm* — Dennemeyer & Associates LLC

(57)                    ABSTRACT

Disclosed in the present disclosure is a high-dynamic-response switching power supply and a server. The switching power supply includes: a first output path includes a first field-effect transistor, a flying capacitor, and a primary coil of a first Trans-inductor (TL) which are sequentially connected in series; the second output path includes a fourth field-effect transistor and a primary coil of a second TL which are connected in series; the resonant loop includes a secondary coil of a first TL, a secondary coil of a second TL and a resonant inductor which are annularly connected, and the secondary coil of the first TL and the secondary coil of the second TL each generate an inductive current in response to a current change in the corresponding primary coils thereof; and the resonant switch includes a second field-
(Continued)

effect transistor and a third field-effect transistor. The present disclosure may respond to a high-power dynamic load requirement at high speed as well as reduce hardware materials and costs.

16 Claims, 4 Drawing Sheets

(51) Int. Cl.
  *H02M 3/158* (2006.01)
  *G06F 1/26* (2006.01)

(56) References Cited

U.S. PATENT DOCUMENTS

| | | | |
|---|---|---|---|
| 2021/0075323 A1* | 3/2021 | Jin ........................... | H02M 3/01 |
| 2021/0265909 A1* | 8/2021 | Ye .......................... | H02M 3/158 |

FOREIGN PATENT DOCUMENTS

| | | |
|---|---|---|
| CN | 108599564 A | 9/2018 |
| CN | 110165892 A | 8/2019 |
| CN | 112564492 A | 3/2021 |

OTHER PUBLICATIONS

Search report for Chinese application No. 202011311785.6 filed on Nov. 20, 2020.

* cited by examiner

HIGH-DYNAMIC-RESPONSE SWITCHING POWER SUPPLY AND SERVER

CROSS-REFERENCE TO RELATED APPLICATIONS

This is a 35 U.S.C. 371 National Stage Patent Application of International Application No. PCT/CN2021/121435, filed Sep. 28, 2021, which claims priority to Chinese application 202011311785.6, filed Nov. 20, 2020, each of which is hereby incorporated by reference in its entirety.

TECHNICAL FIELD

The present disclosure relates to the field of storage, and in particular relates to a high-dynamic-response switching power supply and a server.

BACKGROUND

With the development of big data, cloud computing and Artificial Intelligence (AI) technology, higher requirements are put forward for the computing performance of a server, and the power of the server is also multiplied. In order to reduce the loss on a copper bar in a data center, a bus on the server power copper bar is gradually increased from 12V to 48V. When a 48V power transmitted to a motherboard, the 48V power supply needs to be converted to 12V first, and then converted to a working voltage of a Central Processing Unit (CPU), a Graphics Processing Unit (GPU), an accelerator card and other chips using a traditional Buck (step-down) converter. At present, a common 48V-to-12V architecture has an open-loop Switched Capacitor (STC). However, Non-Volatile Memory Expansion (NVME), a Hard Disk Drive (HDD), a fan, a 12V GPU and the like all need a stable 12V power supply, which cannot be met by the open-loop architecture, so an STC-Buck architecture can be used. However, in a related art numbers of devices in the STC-Buck architecture are needed, and the cost of the STC-Buck architecture is high, maximum output power is not insufficient and dynamic response speed is slow.

With regard to the problems of numbers of devices in the STC-Buck architectures, high cost, insufficient power and slow dynamic response in existing technologies, there is no effective solution at present.

SUMMARY

On the basis of the above purpose, a first aspect of the embodiments of the present disclosure provides a high-dynamic-response switching power supply, which may include:

A first output path includes a first field-effect transistor, a flying capacitor and a primary coil of a first Trans-inductor (TL) which are sequentially connected in series. Herein, the first field-effect transistor is connected to a voltage source to obtain a working voltage, and the primary coil of the first TL is connected to an output end to output a step-down dynamic voltage.

A second output path includes a fourth field-effect transistor and a primary coil of a second TL which are connected in series. Herein, the fourth field-effect transistor is connected to the voltage source to obtain the working voltage, and the primary coil of the second TL is connected to the output end to output the step-down dynamic voltage.

A resonant loop includes a secondary coil of a first TL, a secondary coil of a second TL and a resonant inductor which are annularly connected, and the secondary coil of the first TL generate an inductive current in response to a current change in the primary coil of the first TL and the secondary coil of the second TL generate an inductive current in response to a current change in the primary coil of the second TL.

A resonant switch includes a second field-effect transistor and a third field-effect transistor which straddle the first output path and the second output path, and the second field-effect transistor and the third field-effect transistor are configured to cut off the voltage source when the second field-effect transistor and the third field-effect transistor are turned on so as to output the step-down dynamic voltage to the output end based on the inductive current.

In some embodiments, one end of the second field-effect transistor is connected between the first field-effect transistor and the flying capacitor, and the other end of the second field-effect transistor is connected between the fourth field-effect transistor and the primary coil of the second TL. One end of the third field-effect transistor is connected between the flying capacitor and the primary coil of the first TL, and the other end of the third field-effect transistor is grounded.

In some embodiments, the second field-effect transistor and the third field-effect transistor are turned off in response to the turn-on of the first field-effect transistor and the fourth field-effect transistor, so that the resonant loop in a steady state has the inductive current in a same direction.

In some embodiments, the second field-effect transistor and the third field-effect transistor are turned on in response to the turn-off of the first field-effect transistor and the fourth field-effect transistor, so that the resonant loop in the steady state has the inductive current in an opposite direction.

In some embodiments, a cathode end of the voltage source and one end of the resonant inductor are grounded, and an anode end of the voltage source and an output end are grounded via a protection capacitor.

In some embodiments, the first output path and the second output path are spliced together through a combined architecture of an STC and a buck circuit.

In some embodiments, the voltage source provides a working voltage of 12 volts.

A second aspect of the embodiments of the present disclosure provides a server, which may include:

a voltage source;
a power consumption device; and
a switching power supply which is connected to the power consumption device through an output end and provides the power consumption device with an output voltage with high dynamic response, including:

A first output path includes a first field-effect transistor, a flying capacitor and a primary coil of a first TL which are sequentially connected in series. Herein, the first field-effect transistor is connected to the voltage source to obtain a working voltage, and the primary coil of the first TL is connected to the output end to output a step-down dynamic voltage.

A second output path includes a fourth field-effect transistor and a primary coil of a second TL which are connected in series. Herein, the fourth field-effect transistor is connected to the voltage source to obtain the working voltage, and the primary coil of the second TL is connected to the output end to output the step-down dynamic voltage.

A resonant loop includes a secondary coil of a first TL, a secondary coil of a second TL and a resonant inductor which are annularly connected, and the secondary coil of the first TL generate an inductive current in response to a current change in the primary coil of the first TL and the secondary coil of the second TL generate an inductive current in response to a current change in the primary coil of the second TL.

A resonant switch includes a second field-effect transistor and a third field-effect transistor which straddle the first output path and the second output path, and the second field-effect transistor and the third field-effect transistor are configured to cut off the voltage source when the second field-effect transistor and the third field-effect transistor are turned on so as to output the step-down dynamic voltage to the output end based on the inductive current.

In some embodiments, one end of the second field-effect transistor is connected between the first field-effect transistor and the flying capacitor, and the other end of the second field-effect transistor is connected between the fourth field-effect transistor and the primary coil of the second TL. One end of the third field-effect transistor is connected between the flying capacitor and the primary coil of the first TL, and the other end of the third field-effect transistor is grounded.

In some embodiments, the second field-effect transistor and the third field-effect transistor are turned off in response to the turn-on of the first field-effect transistor and the fourth field-effect transistor, so that the resonant loop in a steady state has the inductive current in the same direction. The second field-effect transistor and the third field-effect transistor are turned on in response to the turn-off of the first field-effect transistor and the fourth field-effect transistor, so that the resonant loop in the steady state has the inductive current in an opposite direction.

BRIEF DESCRIPTION OF THE DRAWINGS

In order to more clearly explain the technical solutions in the embodiments of this disclosure or in the related art, the drawings required in the descriptions of the embodiments or the related art will be briefly introduced below. It is apparent that the drawings in the following descriptions are some embodiments of this disclosure. Those of ordinary skill in the art may also obtain other drawings in accordance with these drawings without paying creative labor.

DETAILED DESCRIPTION OF THE EMBODIMENTS

To make the objectives, technical solutions, and advantages of the present disclosure clearer, the embodiments of the present disclosure are described in details below with reference to embodiments and accompanying drawings.

It is to be noted that all expressions "first" and "second" used in the embodiments of the present disclosure are used to distinguish that two same names are not the same entities or the same parameters. It is to be seen that "first" and "second" are for the convenience of expression and shall not be understood as the limitation of the embodiments of the present disclosure, which will not be explained in subsequent embodiments.

Figure 1:
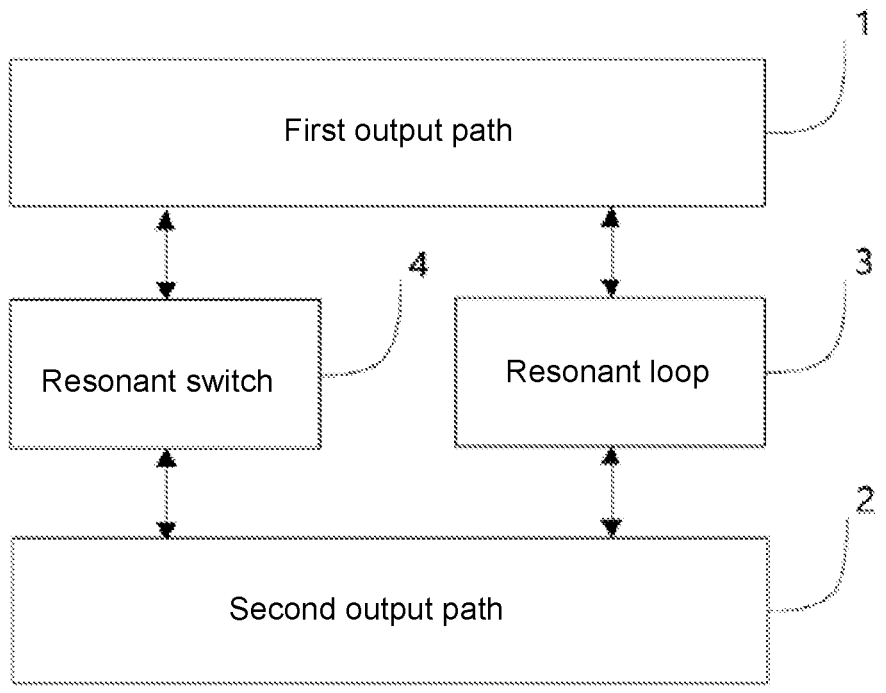
FIG. 1 is a schematic flowchart of a high-dynamic-response switching power supply according to an embodiment of the present disclosure.

On the basis of the above purpose, a first aspect of the embodiments of the present disclosure provides an embodiment of a high-dynamic-response switching power supply which responds to a high-power dynamic load requirement at high speed. FIG. 1 shows a schematic flowchart of a high-dynamic-response switching power supply according to the present disclosure.

The high-dynamic-response switching power supply, as shown in FIG. 1, includes:

A first output path 1 includes a first field-effect transistor, a flying capacitor and a primary coil of a first TL which are sequentially connected in series. Herein, the first field-effect transistor is connected to a voltage source to obtain a working voltage, and the primary coil of the first TL is connected to an output end to output a step-down dynamic voltage.

A second output path 2 includes a fourth field-effect transistor and a primary coil of a second TL which are connected in series. Herein, the fourth field-effect transistor is connected to the voltage source to obtain the working voltage, and the primary coil of the second TL is connected to the output end to output the step-down dynamic voltage.

A resonant loop 3 includes a secondary coil of a first TL, a secondary coil of a second TL and a resonant inductor which are annularly connected, and the secondary coil of the first TL generate an inductive current in response to a current change in the primary coil of the first TL and the secondary coil of the second TL generate an inductive current in response to a current change in the primary coil of the second TL.

A resonant switch 4 includes a second field-effect transistor and a third field-effect transistor which straddle the first output path and the second output path, and the second field-effect transistor and the third field-effect transistor are configured to cut off the voltage source when the second field-effect transistor and the third field-effect transistor are turned on so as to output the step-down dynamic voltage to the output end based on the inductive current.

In some embodiments, one end of the second field-effect transistor is connected between the first field-effect transistor and the flying capacitor, and the other end of the second field-effect transistor is connected between the fourth field-effect transistor and the primary coil of the second TL. One end of the third field-effect transistor is connected between the flying capacitor and the primary coil of the first TL, and the other end of the third field-effect transistor is grounded.

In some embodiments, the second field-effect transistor and the third field-effect transistor are turned off in response to the turn-on of the first field-effect transistor and the fourth field-effect transistor, so that the resonant loop 3 in a steady state has the inductive current in the same direction.

In some embodiments, the second field-effect transistor and the third field-effect transistor are turned on in response to the turn-off of the first field-effect transistor and the fourth field-effect transistor, so that the resonant loop 3 in the steady state has the inductive current in an opposite direction.

In some embodiments, a cathode end of the voltage source and one end of the resonant inductor are grounded, and an anode end of the voltage source and the output end are grounded via a protection capacitor.

In some embodiments, the first output path 1 and the second output path 2 are spliced together through a combined architecture of an STC and a buck circuit.

In some embodiments, the voltage source provides a working voltage of 12 volts.

Figure 2:
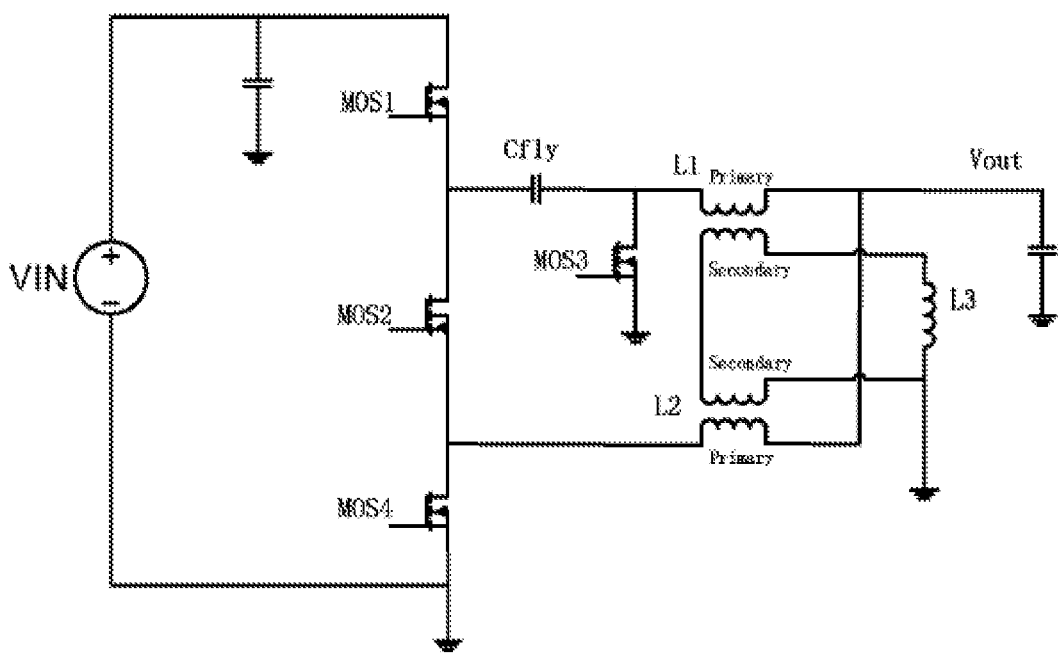
FIG. 2 is a schematic circuit diagram of a high-dynamic-response switching power supply according to an embodiment of the present disclosure.

The embodiments of the present disclosure is further described below with reference to the embodiment shown in FIG. 2.

An embodiment of the present disclosure proposes a novel 48V power converter architecture. Compared with a dual-output ST+Buck architecture in the related art, L1 of the upper Buck and L2 of the lower Buck are replaced with TLs, and meanwhile, a resonant inductor L3 is additionally arranged. As shown in FIG. 2, a primary side (primary coil) of L1 is connected as L1 in FIG. 2, and the primary side of L2 is connected as L2 in FIG. 2. Secondary sides (secondary coils) of L1 and secondary sides of L2 are connected in series with the resonant inductor L3.

Figure 3:
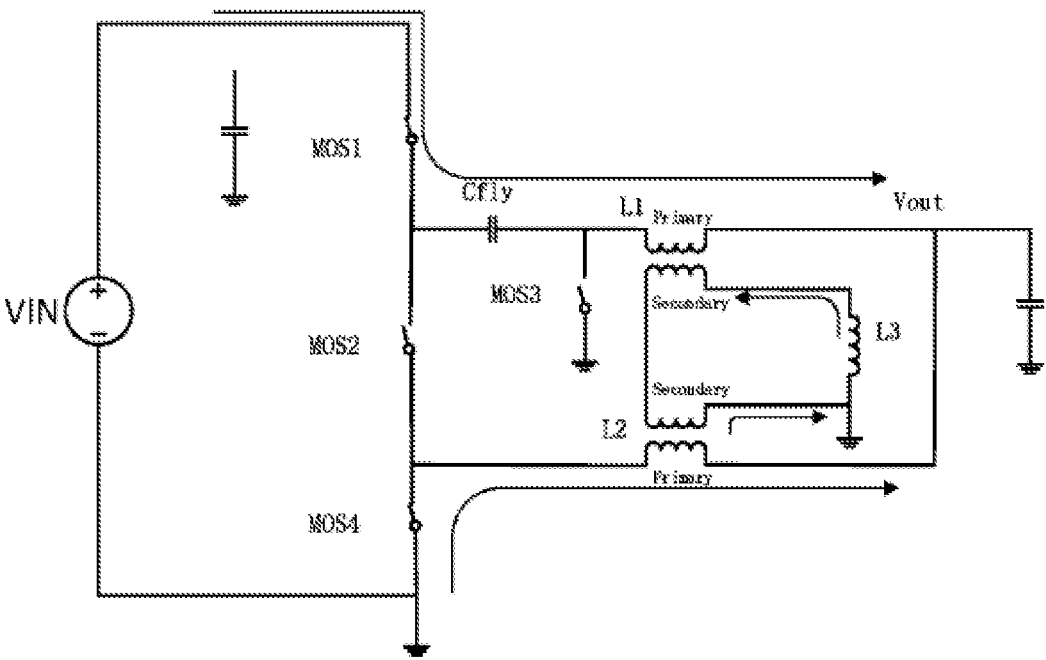
FIG. 3 is an equivalent circuit diagram of a high-dynamic-response switching power supply according to an embodiment of the present disclosure.

In the steady state, when a Metal-Oxide-Semiconductor 1 (MOS1) and an MOS4 are turned on and an MOS2 and an MOS3 are turned off, the equivalent circuit diagram thereof is shown in FIG. 3. The input voltage charges Cfly and L1, and a current path flows as indicated by a curve, including secondary resonant inductive currents of L1 and secondary resonant inductive currents of L2. Correspondingly, in the steady state, when the MOS1 and the MOS4 are turned off and the MOS2 and the MOS3 are turned on, the resonant inductive current direction is reversed.

Figure 4:
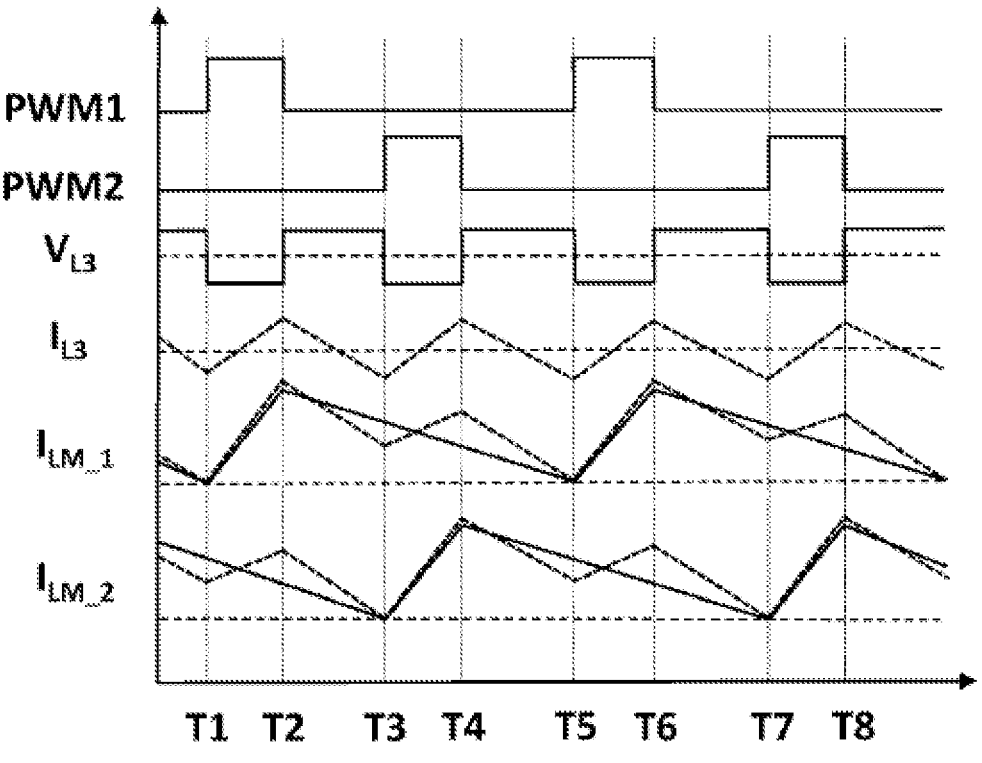
FIG. 4 is a line graph of steady-state work of a high-dynamic-response switching power supply according to an embodiment of the present disclosure.

When the load is constant, the working process of the circuit is shown in FIG. 4. The existence of the resonant inductor L3 leads to an inductive ripple current of the upper Buck corresponding to $I_{LM\_1}$ in FIG. 4, and the inductive ripple current of the lower Buck corresponding to $I_{LM\_2}$ in FIG. 4.

Figure 5:
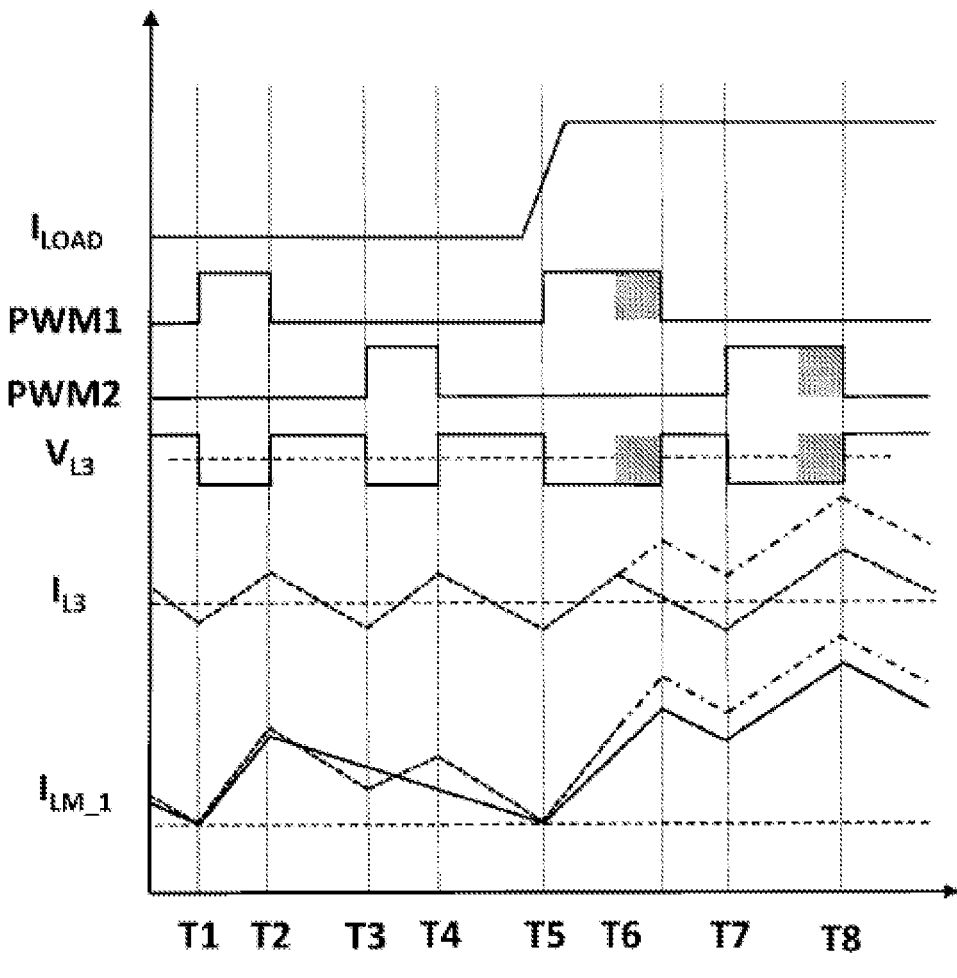
FIG. 5 is a line graph of dynamic response of a high-dynamic-response switching power supply according to an embodiment of the present disclosure.

When in a dynamic state, the working process of the circuit is shown in FIG. 5. $I_{LOAD}$ is the current of the load output by the power supply. During T4-T5, the load current suddenly changes and suddenly increases. After a controller detects that the output current becomes larger, duty cycle is adjusted and increased, thus supplementing more energy to the output. Taking the inductive current $I_{LM\_1}$ of the Buck as an example, the solid line therein is a response curve of the related art, the dotted line is a steady-state response curve of the present disclosure, and the dotted line is a dynamic response curve of the present disclosure. It is apparent that the current response speed of the new architecture is increased, thus supplementing more energy to the output.

It is to be seen from the above embodiment that the high-dynamic-response switching power supply provided by the embodiments of the present disclosure may respond to a high-power dynamic load requirement at high speed as well as reduce hardware materials and costs by using a technical solution that the first output path includes the first field-effect transistor, the flying capacitor and the primary coil of the first TL which are sequentially connected in series; the first field-effect transistor is connected to the voltage source to obtain the working voltage, and the primary coil of the first TL is connected to the output end to output the step-down dynamic voltage; the second output path includes a fourth field-effect transistor and a primary coil of a second TL which are connected in series; the fourth field-effect transistor is connected to the voltage source to obtain the working voltage, and the primary coil of the second TL is connected to the output end to output the step-down dynamic voltage; the resonant loop includes the secondary coil of the first TL, the secondary coil of the second TL and the resonant inductor which are annularly connected, and the secondary coil of the first TL generate an inductive current in response to a current change in the primary coil of the first TL and the secondary coil of the second TL generate an inductive current in response to the current change in the primary coil of the second TL; and the resonant switch includes a second field-effect transistor and a third field-effect transistor which straddle the first output path and the second output path, and the second field-effect transistor and the third field-effect transistor are configured to cut off the voltage source when the second field-effect transistor and the third field-effect transistor are turned on so as to output the step-down dynamic voltage to the output end based on the inductive current.

On the basis of the above purpose, a second aspect of the embodiments of the present disclosure provides an embodiment of a server which responds to the high-power dynamic load requirement at high speed. The server includes:

a voltage source;

a power consumption device; and a switching power supply which is connected to the power consumption device through an output end and provides the power consumption device with an output voltage with high dynamic response, including:

A first output path includes a first field-effect transistor, a flying capacitor and a primary coil of a first TL which are sequentially connected in series. Herein, the first field-effect transistor is connected to the voltage source to obtain a working voltage, and the primary coil of the first TL is connected to the output end to output a step-down dynamic voltage.

A second output path includes a fourth field-effect transistor and a primary coil of a second TL which are connected in series. Herein, the fourth field-effect transistor is connected to the voltage source to obtain the working voltage, and the primary coil of the second TL is connected to the output end to output the step-down dynamic voltage.

A resonant loop includes a secondary coil of a first TL, a secondary coil of a second TL and a resonant inductor which are annularly connected, and the secondary coil of the first TL generate an inductive current in response to a current change in the primary coil of the first TL and the secondary coil of the second TL generate an inductive current in response to a current change in the primary coil of the second TL.

A resonant switch includes a second field-effect transistor and a third field-effect transistor which straddle the first output path and the second output path, and the second field-effect transistor and the third field-effect transistor are configured to cut off the voltage source when the second field-effect transistor and the third field-effect transistor are turned on so as to output the step-down dynamic voltage to the output end based on the inductive current.

In some embodiments, one end of the second field-effect transistor is connected between the first field-effect transistor and the flying capacitor, and the other end of the second field-effect transistor is connected between the fourth field-effect transistor and the primary coil of the second TL. One end of the third field-effect transistor is connected between the flying capacitor and the primary coil of the first TL, and the other end of the third field-effect transistor is grounded.

In some embodiments, the second field-effect transistor and the third field-effect transistor are turned off in response to the turn-on of the first field-effect transistor and the fourth field-effect transistor, so that the resonant loop in a steady state has the inductive current in the same direction. The second field-effect transistor and the third field-effect transistor are turned on in response to the turn-off of the first field-effect transistor and the fourth field-effect transistor, so that the resonant loop in the steady state has the inductive current in an opposite direction.

It is to be seen from the above embodiment that the high-dynamic-response server provided by the embodiments of the present disclosure may respond to a high-power dynamic load requirement at high speed as well as reduce hardware materials and costs by using a technical solution that the first output path includes the first field-effect transistor, the flying capacitor and the primary coil of the first TL which are sequentially connected in series; the first field-effect transistor is connected to the voltage source to obtain the working voltage, and the primary coil of the first TL is connected to the output end to output the step-down dynamic voltage; the second output path includes a fourth field-effect transistor and a primary coil of a second TL which are connected in series; the fourth field-effect transistor is connected to the voltage source to obtain the working voltage, and the primary coil of the second TL is connected to the output end to output the step-down dynamic voltage; the resonant loop includes the secondary coil of the first TL, the secondary coil of the second TL and the resonant inductor which are annularly connected, and the secondary coil of the first TL generate an inductive current in response to a current change in the primary coil of the first TL and the secondary coil of the second TL generate an inductive current in response to the current change in the primary coil of the second TL; and the resonant switch includes a second field-effect transistor and a third field-effect transistor which straddle the first output path and the second output path, and the second field-effect transistor and the third field-effect transistor are configured to cut off the voltage source when the second field-effect transistor and the third field-effect transistor are turned on so as to output the step-down dynamic voltage to the output end based on the inductive current.

It is to be pointed out that the embodiment of the above server adopts the embodiment of the high-dynamic-response switching power supply to explain the working process of each component, and those skilled in the art can easily conceive of applying these components to other embodiments of the high-dynamic-response switching power supply. Of course, since all steps in the embodiment of the high-dynamic-response switching power supply may cross, replace, add and delete each other, these reasonable permutations, combinations and transformations for the server shall also belong to the scope of protection of the present disclosure, and the scope of protection of the present disclosure shall not be limited to the embodiment.

The above are the exemplary embodiments disclosed in the disclosure, but it should be noted that various changes and modifications may be made without departing from the scope of the embodiments disclosed in the disclosure defined by the claims. The functions, steps and/or actions of the switching power supply claims according to the disclosed embodiments described herein need not be executed in any particular order. In addition, although the elements disclosed in the embodiments of the present disclosure may be described or claimed in individual form, they may also be understood as multiple unless explicitly limited to singular.

Those of ordinary skill in the art should understand that the discussion of any of the above embodiments is exemplary, and is not intended to imply that the scope (including the claims) disclosed by the embodiments of the disclosure is limited to these examples. Under the idea of the embodiments of the present disclosure, technical features in the above embodiments or different embodiments may also be combined, and there are many other variations of different aspects of the above embodiments of the present disclosure, which are not provided in details for brevity. Therefore, any omission, modification, equivalent substitution, improvement, etc. made within the spirit and principle of the embodiments of the disclosure should be included in the scope of protection of the embodiments of the disclosure.

The invention claimed is:

1. A high-dynamic-response switching power supply, comprising:
    a first output path, comprising a first field-effect transistor, a flying capacitor and a first primary coil of a first Trans-inductor (TL) which are sequentially connected in series, wherein the first field-effect transistor is connected to a voltage source to obtain a working voltage, the first primary coil of the first TL is connected to an output end to output a step-down dynamic voltage;
    a second output path, comprising a fourth field-effect transistor and a second primary coil of a second TL which are connected in series, wherein the fourth field-effect transistor is connected to the voltage source to obtain the working voltage, the second primary coil of the second TL is connected to the output end to output the step-down dynamic voltage;
    a resonant loop, comprising a first secondary coil of the first TL, a second secondary coil of the second TL and a resonant inductor which are annularly connected, wherein the first secondary coil of the first TL generates a first inductive current in response to a first current change in the first primary coil of the first TL and the second secondary coil of the second TL generates a second inductive current in response to a second current change in the second primary coil of the second TL; and
    a resonant switch, comprising a second field-effect transistor connected between the first output path and the second output path and a third field-effect transistor, wherein the second field-effect transistor and the third field-effect transistor are configured to cut off the voltage source from the first field-effect transistor and the fourth field-effect transistor when the second field-effect transistor and the third field-effect transistor are turned on so as to output the step-down dynamic voltage to the output end based on the first inductive current and the second inductive current;
    wherein one end of the second field-effect transistor is connected between the first field-effect transistor and the flying capacitor, an other end of the second field-effect transistor is connected between the fourth field-effect transistor and the second primary coil of the second TL, wherein one end of the third field-effect transistor is connected between the flying capacitor and the first primary coil of the first TL, an other end of the third field-effect transistor is grounded.

2. The switching power supply as claimed in claim 1, wherein the second field-effect transistor and the third field-effect transistor are turned off in response to the turn-on of the first field-effect transistor and the fourth field-effect transistor, so that the first inductive current generated by the first second secondary coil of the first TL and the second inductive current generated by the second secondary coil of the second TL in the resonant loop in a steady state are in a same direction.

3. The switching power supply as claimed in claim 2, wherein in response to the first field-effect transistor and the fourth field-effect transistor are turned on, the second field-effect transistor and the third field-effect transistor are turned off, an input voltage obtained by the first field-effect transistor from a voltage source charges the flying capacitor and the first TL.

4. The switching power supply as claimed in claim 1, wherein the switching power supply is applied in a 48V power converter architecture.

5. The switching power supply as claimed in claim 1, further comprising: in response to the increase of an output current of the output end, a duty cycle is adjusted and increased.

6. The switching power supply as claimed in claim 1, wherein the second field-effect transistor and the third field-effect transistor are turned on in response to the turn-off of the first field-effect transistor and the fourth field-effect transistor, so that the first inductive current generated by the first secondary coil of the first TL and the second inductive current generated by the second secondary coil of the second TL in the resonant loop in a steady state are in an opposite direction.

7. The switching power supply as claimed in claim 1, wherein a cathode end of the voltage source and one end of the resonant inductor are grounded, an anode end of the voltage source and the output end are grounded via a protection capacitor.

8. The switching power supply as claimed in claim 1, wherein the first output path and the second output path are spliced together through a combined architecture of a Switched Capacitor (STC) and a buck circuit.

9. The switching power supply as claimed in claim 1, wherein the voltage source provides the working voltage of 12 volts.

10. A server, comprising:
a voltage source;
a power consumption device; and
a switching power supply which is connected to the power consumption device through an output end and provides the power consumption device with an output voltage with high dynamic response, comprising:
a first output path, comprising a first field-effect transistor, a flying capacitor and a first primary coil of a first Trans-inductor (TL) which are sequentially connected in series, wherein the first field-effect transistor is connected to the voltage source to obtain a working voltage, the first primary coil of the first TL is connected to the output end to output a step-down dynamic voltage;
a second output path, comprising a fourth field-effect transistor and a second primary coil of a second TL which are connected in series, wherein the fourth field-effect transistor is connected to the voltage source to obtain the working voltage, the second primary coil of the second TL is connected to the output end to output the step-down dynamic voltage;
a resonant loop, comprising a first secondary coil of the first TL, a second secondary coil of the second TL and a resonant inductor which are annularly connected, wherein the first secondary coil of the first TL generates a first inductive current in response to a first current change in the first primary coil of the first TL and the second secondary coil of the second TL generates a second inductive current in response to a second current change in the second primary coil of the second TL; and
a resonant switch, comprising a second field-effect transistor connected between the first output path and the second output path and a third field-effect transistor wherein the second field-effect transistor and the third field-effect transistor are configured to cut off the voltage source from the first field-effect transistor and the the fourth field-effect transistor when the second field-effect transistor and the third field-effect transistor are turned on so as to output the step-down dynamic voltage to the output end based on the first inductive current and the second inductive current;
wherein one end of the second field-effect transistor is connected between the first field-effect transistor and the flying capacitor, an other end of the second field-effect transistor is connected between the fourth field-effect transistor and the second primary coil of the second TL, wherein one end of the third field-effect transistor is connected between the flying capacitor and the first primary coil of the first TL, an other end of the third field-effect transistor is grounded.

11. The server as claimed in claim 10, wherein the second field-effect transistor and the third field-effect transistor are turned off in response to the turn-on of the first field-effect transistor and the fourth field-effect transistor, so that the first inductive current generated by the first secondary coil of the first TL and the second inductive current generated by the second secondary coil of the second TL in the resonant loop in a steady state are in a same direction, wherein the second field-effect transistor and the third field-effect transistor are turned on in response to the turn-off of the first field-effect transistor and the fourth field-effect transistor, so that the first inductive current generated by the first secondary coil of the first TL and the second inductive current generated by the second secondary coil of the second TL in the resonant loop in a steady state are in an opposite direction.

12. The server as claimed in claim 10, wherein a cathode end of the voltage source and one end of the resonant inductor are grounded, an anode end of the voltage source and the output end are grounded via a protection capacitor.

13. The server as claimed in claim 10, wherein the first output path and the second output path are spliced together through a combined architecture of a Switched Capacitor (STC) and a buck circuit.

14. The server as claimed in claim 10, wherein the voltage source provides the working voltage of 12 volts.

15. The server as claimed in claim 10, wherein the server comprises a 48V power converter architecture.

16. A high-dynamic-response switching power supply, comprising:
a first output path, comprising a first field-effect transistor, which is connected to a voltage source to obtain a working voltage, and a first primary coil of a first Trans-inductor (TL), which is connected to an output end to output a step-down dynamic voltage;
a second output path, comprising a fourth field-effect transistor and a second primary coil of a second TL which are connected in series, wherein the fourth field-effect transistor is connected to the voltage source to obtain the working voltage, second primary coil of the second TL is connected to the output end to output the step-down dynamic voltage;
a resonant loop, configured to generate an inductive current;
a resonant switch, comprising a second field-effect transistor connected between the first output path and the second output path and a third field-effect transistor, wherein the second field-effect transistor and the third field-effect transistor are configured to cut off the voltage source from the first field-effect transistor and the fourth field-effect transistor when the second field-effect transistor and the third field-effect transistor are turned on so as to output the step-down dynamic voltage to the output end based on the inductive current;

wherein one end of the second field-effect transistor is connected between the first field-effect transistor and a flying capacitor, an other end of the second field-effect transistor is connected between the fourth field-effect transistor and the second primary coil of the second TL, wherein one end of the third field-effect transistor is connected between the flying capacitor and the first primary coil of the first TL, an other end of the third field-effect transistor is grounded.

* * * * *